United States Patent

Mager et al.

[15] 3,686,841
[45] Aug. 29, 1972

[54] ROTARY THATCHER

[72] Inventors: Donald V. Mager, Minneapolis, Minn. 55420; Frederick R. Mager, Minneapolis, Minn. 55423

[73] Assignee: Mechanize Incorporated, Minneapolis, Minn.

[22] Filed: Oct. 30, 1970

[21] Appl. No.: 85,725

Related U.S. Application Data

[63] Continuation of Ser. No. 737,706, June 17, 1968, abandoned.

[52] U.S. Cl. .................................. 56/17.5, 56/295
[51] Int. Cl. .............................................. A01d 51/00
[58] Field of Search ........................... 56/295, 17.5

[56] References Cited

UNITED STATES PATENTS

| | | | |
|---|---|---|---|
| 3,321,026 | 5/1967 | Hubbard | 56/295 X |
| 2,836,021 | 5/1958 | Wood et al. | 56/295 |
| 2,891,369 | 6/1959 | Rietz | 56/295 X |

FOREIGN PATENTS OR APPLICATIONS

| | | | |
|---|---|---|---|
| 1,139,118 | 1/1969 | Canada | 56/17.5 |

*Primary Examiner*—Louis G. Mancene
*Assistant Examiner*—J. N. Eskovitz
*Attorney*—Edward L. Schwarz

[57] ABSTRACT

A rotary thatcher comprising a horizontally disposed unitary elongated blade having end projections extending downwardly therefrom and including means for attaching said blade to a shaft for rotation. The downwardly extending projections have a rearwardly sloping leading edge to provide better self-cleaning and to deflect rocks, and other encountered objects in a downward direction thus providing a safety feature. Also, a portion of the trailing edge of the blade is sloped upwardly to create a vacuum under the blade which tends to lift leaves, grass and other particles.

3 Claims, 4 Drawing Figures

INVENTORS
DONALD V. MAGER
FREDERICK R. MAGER

BY  Alfred E. Hall
ATTORNEY

ROTARY THATCHER

This application is a streamlined continuation of my earlier filed application, Ser. No. 737,706, filed June 17, 1968 and now abandoned.

BACKGROUND OF THE INVENTION

Prior art patents such as that issued to Bright, U.S. Pat. No. 3,015,929, disclose rake devices which may be attached to the horizontally disposed blade of a conventional lawn mower. These devices are affixed to the blade so that as the blade rotates, grass, cuttings or the like will be moved or raked or otherwise shifted in position. Such a device is effective for raking freshly cut grass or loose, lightweight particles. However, if it is attempted to use the device to thatch or rake material embedded near the roots of the grass, it has several disadvantages. First, the attached element presents a broad front to the grass and, if lowered excessively, will actually destroy the grass by digging it out of the ground by its roots. Secondly, such a broad front creates a danger and operating hazard since it will tend to pick up and throw rocks and other objects which may be in its path. Thirdly, if the rivet or other means by which the attachment is affixed to the blade is damaged under stress, the high rotary speeds of the blade may in fact cause the attachment to be thrown from the blade at a high speed which could also be a serious operating hazard. Finally, the attachment cannot actually rake the dead grass and leaves or other material that may be imbedded in the grass since it must ride above the root portions of the grass to prevent destruction of the grass by digging it out of the ground by its roots.

SUMMARY OF THE INVENTION

The present invention is a rotary thatcher which improves over the prior art by providing a unitary elongated blade having end projections or fingers extending downwardly therefrom and including means for attaching the blade to a powered shaft for horizontal rotation. The blade can be made of unitary construction merely by bending a predetermined length of the outermost ends of the blade in the same direction 90°° to the horizontal plane of the blade. Since these end projections have a very small thickness, they provide an extremely small or narrow front to the grass and, thus, can actually extend down into the material near the grass roots without destroying the grass itself.

Also, even though the narrow front of the downwardly extending projections presented to the grass and any objects in its path tends to lessen considerably the danger of throwing rocks and other encountered objects at high speed, the present invention further includes providing a rearwardly sloping leading edge to the downwardly extending projections which tends to deflect rocks and other encountered objects in a downward direction thus providing a safety feature.

Further, since the blade is of unitary construction, there is no danger of attached parts flying off under severe stress conditions.

Finally, the present invention includes an upwardly sloping portion of the trailing edge of the blade which tends to create a vacuum that lifts leaves, grass and other particles which may be imbedded near the roots of the grass.

Thus, the invention provides a simple and inexpensive device for converting a rotary lawn mower to a lawn thatcher.

Therefore, it is an object of the present invention to provide a rotary thatcher comprising a unitary elongated blade having end projections or fingers extending downwardly therefrom and including means for attaching the blade to a powered shaft for horizontal rotation.

It is another object of the present invention to provide a rotary thatcher comprising a unitary elongated blade having end projections extending downwardly therefrom and having a rearwardly sloping leading edge on said end projections.

It is still another object of the present invention to provide a rotary thatcher which comprises a unitary elongated blade having end projections extending downwardly therefrom and including an upwardly sloping portion of the trailing edge of the horizontally disposed section of the blade whereby a vacuum is created which tends to lift grass, leaves and other particles which may be imbedded near the roots of the grass.

BRIEF DESCRIPTION OF THE DRAWINGS

These and other more detailed and specific objectives will be disclosed in the course of the following specification reference being had to the accompanying drawings in which like numerals are used to designate like parts throughout the same and in which.

DESCRIPTION OF THE PREFERRED EMBODIMENT

Figure 1:
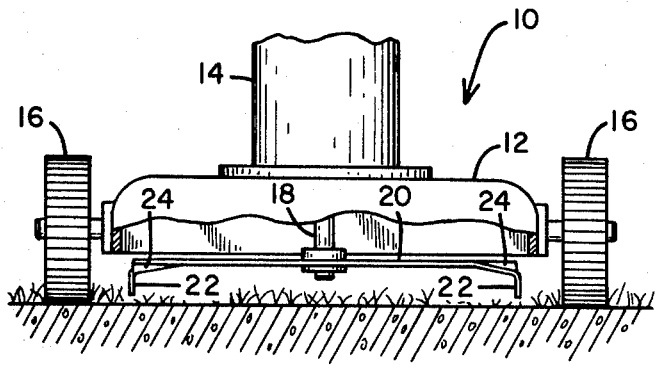
FIG. 1 is an elevational view of a lawn mower equipped with the thatcher of the present invention and with parts broken away and in section.

Referring in detail to FIG. 1, the numeral 10 indicates a conventional lawn mower to which the blade of the present invention may be attached. The lawn mower includes a frame 12 and a motor 14 which may be of the gasoline or electric type. There are also provided wheels 16 which are attached to frame 12. A vertically disposed shaft 18 is driven by the motor 14 and the thatcher 20 of the present invention is horizontally disposed and secured to the lower end of the shaft 18. The thatcher 20 comprises a unitary, elongated blade having end projections 22 extending downwardly therefrom and having an upwardly sloping portion 24 of the trailing edge of the horizontally disposed section of the blade 20.

Figure 2:
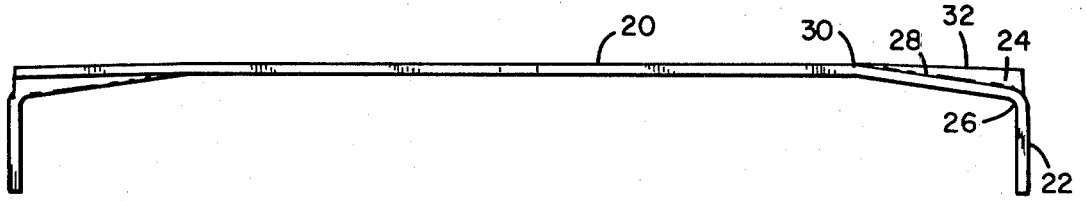
FIG. 2 is a front view of the blade in its operating position and disclosing the unitary feature of the blade as well as the downwardly projecting end portions and the upwardly sloping portion of the trailing edge of the horizontally disposed section of the blade.

FIG. 2 is a front view of the blade 20 in its operating position and discloses the details of the downwardly extending end projections 22 and the upwardly sloping portion 24 of the trailing edge of the blade. The blade 20 is formed by stamping or otherwise forming the blade shape out of stock material and then bending it at point 26 to form end projections 22 and then bending it at point 28 to form the upwardly sloping portion 24 of the trailing edge of the blade. In order to enable easier mounting of the blade 20 on the mower frame, the blade 20 may also be bent at point 30 in an amount which, when the portion 24 of the trailing edge of the blade 20 is bent upwardly, will cause the upper edge 32 of the portion 24 to lie in the same plane as the upper edge of blade 20. This would not be necessary in those situations where bending the trailing edge portion 24 of the blade 20 upwardly would not present problems in mounting the blade 20 on a mower frame.

Figure 3:
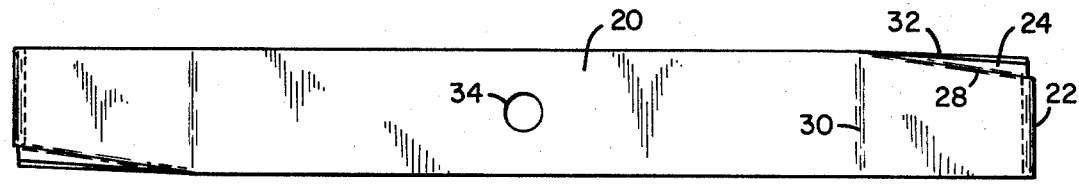
FIG. 3 is a plan view of the blade shown in FIG. 2.

FIG. 3 is a plan view of the blade 20 showing the line 28 along which the trailing edge of the blade 20 is bent upwardly and the point 26 along which the downwardly projecting end section 22 is bent. Also shown in FIG. 3 is the hole 34 by which the blade 20 is mounted on a conventional lawn mower.

Figure 4:
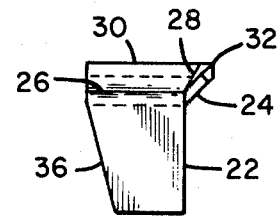
FIG. 4 is an end view of the blade showing the rearwardly sloping leading edge of the end projection.

FIG. 4 is an end view of the blade 20 and shows in detail the rearwardly sloping leading edge portion 36 of the downwardly projecting end portion 22. It also shows how the portion 24 of the trailing edge of blade 20 can be bent upwardly along line 28 to cause the upper edge 32 to lie in the plane in which the upper edge of blade 20 lies.

Thus, the present invention provides a device which would allow easy conversion of an ordinary rotary lawn mower to a power thatcher or rake. Since the blade used consists merely of a unitary elongated blade of any suitable material such as 10-gauge steel and having end projections or fingers extending downwardly and a portion of the trailing edge of the blade sloping upwardly to cause the vacuum, it is simple and inexpensive to construct. Rotation of the downwardly extending projections in conjunction with the forward movement of the mower body or rotating mechanism insures adequate coverage of the surface being thatched or raked.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

What is claimed is:

1. An elongated thatcher blade having a blunt leading edge and a trailing edge, and a first and second end, to replace a cutting blade on a rotary-type lawn mower, said mower having a rotary-powered shaft with said thatcher blade attached thereto by connecting means, said thatcher blade comprising:
   a. end projections integral with each of the first and second ends of the blade, disposed downwardly each having a blunt leading edge sloped rearwardly; and
   b. means formed at each end of said blade adjacent the end projections, said last recited means being sloped upwardly for causing an upward suction beneath the blade.

2. The thatcher blade of claim 1 wherein the blade is comprised of flexible metal.

3. The thatcher blade of claim 2 wherein the flexible metal is 10-gauge steel.

* * * * *